United States Patent
Sugano et al.

(10) Patent No.: US 12,320,369 B2
(45) Date of Patent: Jun. 3, 2025

(54) HYDRAULIC SUPPLY DEVICE

(71) Applicants: JATCO Ltd, Fuji (JP); NISSAN MOTOR CO., LTD., Yokohama (JP)

(72) Inventors: Tomoko Sugano, Yokohama (JP); Takurou Kawasumi, Ebina (JP); Kenji Sakakibara, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/262,978

(22) PCT Filed: Jan. 18, 2022

(86) PCT No.: PCT/JP2022/001499
§ 371 (c)(1),
(2) Date: Jul. 26, 2023

(87) PCT Pub. No.: WO2022/168595
PCT Pub. Date: Aug. 11, 2022

(65) Prior Publication Data
US 2024/0093703 A1 Mar. 21, 2024

(30) Foreign Application Priority Data
Feb. 2, 2021 (JP) .................................. 2021-014933

(51) Int. Cl.
*F15B 11/17* (2006.01)
*F15B 13/02* (2006.01)
(Continued)

(52) U.S. Cl.
CPC ............ *F15B 11/17* (2013.01); *F15B 13/027* (2013.01); *F16H 61/662* (2013.01); *F16H 9/04* (2013.01)

(58) Field of Classification Search
CPC ................... F15B 11/17; F15B 13/027; F15B 2211/20576; F15B 2211/20584;
(Continued)

(56) References Cited

U.S. PATENT DOCUMENTS

| 4,687,177 | A | * | 8/1987 | Hartwig | .............. F15B 13/0405 137/538 |
| 9,863,528 | B2 | * | 1/2018 | Hwang | ............... F16H 61/0206 |
| 2005/0175485 | A1 | * | 8/2005 | Udagawa | ............... F15B 11/167 417/199.1 |

FOREIGN PATENT DOCUMENTS

| CN | 206608537 | * 11/2017 | ............. F16H 61/00 |
| JP | 2016-079992 A | 5/2016 | |

OTHER PUBLICATIONS

Machine Translation of CN 206608537 (2024) (Merged with Refernce).*

* cited by examiner

*Primary Examiner* — Kenneth Bomberg
*Assistant Examiner* — Daniel S Collins
(74) *Attorney, Agent, or Firm* — Foley & Lardner LLP

(57) ABSTRACT

A hydraulic supply device includes: a first oil pump configured to supply oil to a supply passage; a second oil pump driven together with the first oil pump or driven when the first oil pump is stopped; a first check valve provided in a first oil passage that allows a suction side of the second oil pump to communicate with an oil source, and configured to close the first oil passage when the second oil pump is stopped; a second check valve provided in a second oil passage that allows a discharge side of the second oil pump to communicate with the supply passage, and configured to close the second oil passage when the second oil pump is stopped; and a third oil passage into which the oil supplied to the supply passage flows, wherein the oil flowing into the third oil passage is used as an auxiliary pressure for opera- (Continued)

tion of the second check valve when the second oil passage is closed.

6 Claims, 8 Drawing Sheets

(51) Int. Cl.
 *F16H 61/662* (2006.01)
 *F16H 9/04* (2006.01)

(58) Field of Classification Search
 CPC ............. F16H 57/0434; F16H 57/0441; F16H 57/0446; F16K 17/08; Y10T 137/7925
 USPC ........................................................ 137/538
 See application file for complete search history.

< PRIOR ART >

HYDRAULIC SUPPLY DEVICE

TECHNICAL FIELD

The present invention relates to a hydraulic supply device.

BACKGROUND ART

A hydraulic supply device supplies hydraulic oil to a hydraulically operated machine such as an automatic transmission. The hydraulic supply device includes a mechanical oil pump driven by a driving force of an engine and an electric oil pump driven by a driving force of a motor (for example, see Patent Literature 1). Oil discharged by the mechanical oil pump and the electric oil pump is supplied to a line pressure oil passage. Oil in the line pressure oil passage is adjusted in a pressure regulating circuit and supplied to the hydraulically operated machine as hydraulic oil. The electric oil pump is temporarily driven when the supply of oil from the mechanical oil pump is stopped or when the amount of oil supplied is insufficient.

A check valve is provided in each of oil passages on a suction side and a discharge side of the electric oil pump. When the electric oil pump is stopped, the hydraulic supply device closes the oil passage by the check valve to prevent backflow of oil from the mechanical oil pump.

CITATION LIST

Patent Literature

Patent Literature 1: JP 2016-79992 A

SUMMARY OF INVENTION

In a hydraulic supply device, when stopping an electric oil pump, it is required to quickly operate a check valve to close an oil passage.

A hydraulic supply device according to an embodiment of the present invention having a supply passage for supplying hydraulic oil of a hydraulically operated machine, the hydraulic supply device includes:
- a first oil pump configured to supply oil suctioned from an oil source to the supply passage;
- a second oil pump driven together with the first oil pump or driven when the first oil pump is stopped, and configured to supply the oil suctioned from the oil source to the supply passage;
- a first check valve provided in a first oil passage that allows a suction side of the second oil pump to communicate with the oil source, and configured to close the first oil passage when the second oil pump is stopped;
- a second check valve provided in a second oil passage that allows a discharge side of the second oil pump to communicate with the supply passage, and configured to close the second oil passage when the second oil pump is stopped; and
- a third oil passage communicating with the supply passage and into which the oil supplied to the supply passage flows.

The oil supplied from the first oil pump and flowing into the third oil passage is used as an auxiliary pressure for operation of the second check valve when the second oil passage is closed.

According to an embodiment of the present invention, when an electric oil pump is stopped, a check valve can be quickly operated to close an oil passage.

BRIEF DESCRIPTION OF DRAWINGS

FIGS. 6-6C are diagrams showing operation of the check valve when an electric oil pump is operated.

FIGS. 7-7C are diagrams showing operation of the check valve when the electric oil pump is stopped.

DESCRIPTION OF EMBODIMENTS

Hereinafter, an embodiment of an aspect of the present invention will be described with reference to the drawings.

In the embodiment, a hydraulic supply device that supplies hydraulic oil to a hydraulically operated machine installed in a vehicle will be described as an example. A belt continuously variable transmission, which is a transmission for a vehicle, will be described as an example of the hydraulically operated machine.

Figure 1:
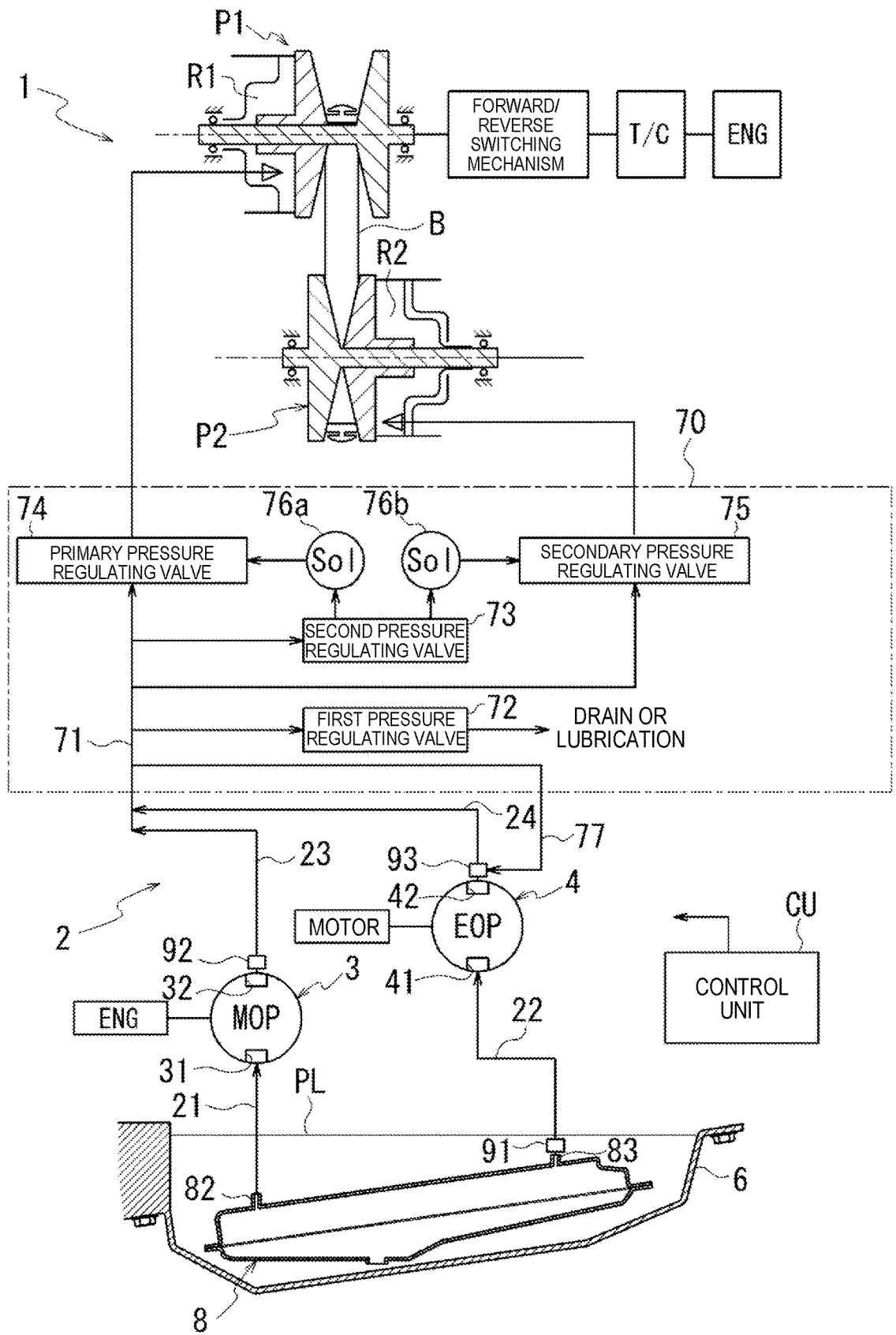
FIG. 1 is a schematic configuration diagram of a belt continuously variable transmission including a hydraulic supply device.

FIG. 1 is a schematic configuration diagram of a belt continuously variable transmission 1 including a hydraulic supply device 2.

Figure 2:
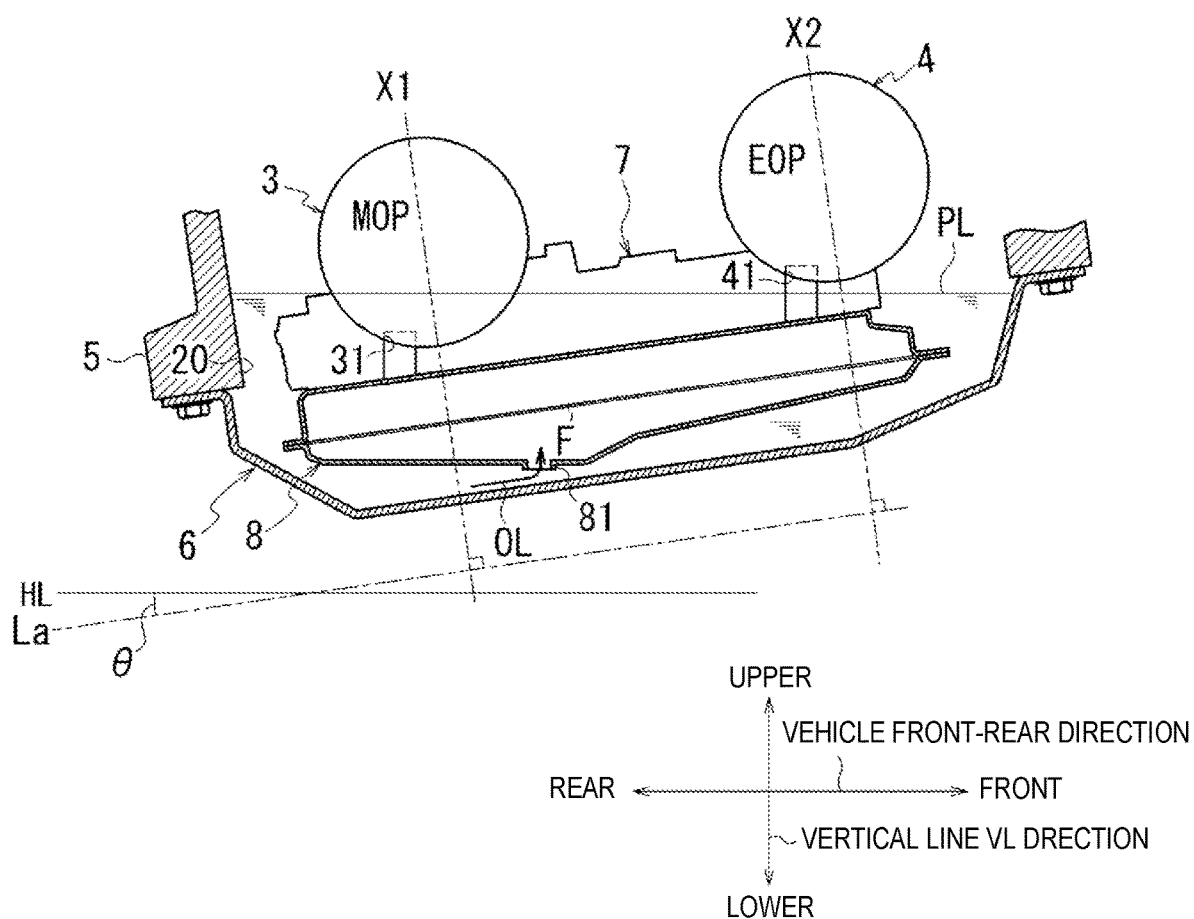
FIG. 2 is a diagram schematically showing a configuration of the hydraulic supply device.

FIG. 2 is a diagram schematically showing a configuration of the hydraulic supply device 2.

As shown in FIG. 1, the belt continuously variable transmission 1 for a vehicle includes a pair of pulleys, a primary pulley P1 and a secondary pulley P2, as a transmission mechanism. The belt continuously variable transmission 1 also includes an endless belt B wound around the pair of pulleys.

In the belt continuously variable transmission 1, winding radii of the belt B on the primary pulley P1 and the secondary pulley P2 are changed. Accordingly, a transmission ratio of rotation transmitted between the primary pulley P1 and the secondary pulley P2 is changed.

Oil chambers R1 and R2 are provided in the primary pulley P1 and the secondary pulley P2, respectively. By adjusting a hydraulic pressure of hydraulic oil supplied to the oil chambers R1 and R2, the winding radii of the belt B on the primary pulley P1 and the secondary pulley P2 are changed.

The belt continuously variable transmission 1 includes the hydraulic supply device 2. The hydraulic supply device 2 includes a mechanical oil pump 3 (a first oil pump) and an electric oil pump 4 (a second oil pump). The hydraulic supply device 2 adjusts a hydraulic pressure of oil discharged by the mechanical oil pump 3 and the electric oil pump 4 with a pressure regulating circuit 70. The pressure regulating circuit 70 supplies the pressure-regulated oil to the oil chambers R1 and R2 as hydraulic oil.

The mechanical oil pump 3 is an oil pump driven by rotation input from a vehicle drive source such as an engine. The mechanical oil pump 3 is switched between operation and stop in conjunction with operation and stop of the vehicle drive source. The electric oil pump 4 is driven by rotation input from a motor installed separately from the vehicle drive source. The electric oil pump 4 is switched between operation and stop by switching operation and stop of the motor by a control device CU.

The electric oil pump 4 is driven when the supply of oil from the mechanical oil pump 3 is stopped, that is, when the mechanical oil pump 3 is stopped. The electric oil pump 4 is driven together with the mechanical oil pump 3 when the amount of oil supplied from the mechanical oil pump 3 is insufficient. The electric oil pump 4 may be operated in place of the mechanical oil pump 3 when the mechanical oil pump 3 is stopped, for example, at the time of idling stop of a vehicle. Alternatively, the electric oil pump 4 may be operated together with the mechanical oil pump 3 when a high hydraulic pressure is required for downshift of the belt continuously variable transmission 1.

As shown in FIG. 2, the belt continuously variable transmission 1 includes a transmission case 5 that houses a transmission mechanism. An oil pan 6 that stores oil OL is provided at a lower portion of the transmission case 5 in a vertical line VL direction. The vertical line VL direction means a vertical line direction based on a state in which the belt continuously variable transmission 1 is mounted on the vehicle. The oil pan 6 covers a lower opening of the transmission case 5. An oil reservoir PL as an oil source is formed in the oil pan 6. The mechanical oil pump 3 and the electric oil pump 4 suction the oil OL from the oil reservoir PL.

When the vehicle of the belt continuously variable transmission 1 travels forward, the oil OL in the oil pan 6 tends to be biased to the rear in a front-rear direction of the vehicle. Therefore, the oil pan 6 attached to the transmission case 5 is inclined so as to be positioned upward from a rear end toward a front end in the front-rear direction of the vehicle. Due to the inclination, the oil reservoir PL is deeper on the rear of the vehicle than on the front of the vehicle. That is, inside the oil pan 6, more oil OL is stored on the rear of the vehicle than on the front of the vehicle.

A control valve body 7 is disposed inside the oil pan 6. The control valve body 7 is fixed to a lower portion of the transmission case 5. Although not shown, the control valve body 7 is configured by sandwiching a separator plate between an upper valve body and a lower valve body. The pressure regulating circuit 70 (see FIG. 1) is built in the control valve body 7.

A strainer 8 is fixed to a lower portion of the control valve body 7. The strainer 8 includes a suction port 81 for the oil OL in a lower portion thereof. The strainer 8 includes a filter F for filtering the oil OL therein.

The mechanical oil pump 3 and the electric oil pump 4 are installed above the strainer 8 in the vertical line VL direction. In FIG. 2, in order to make a positional relation easy to understand, the mechanical oil pump 3 and the electric oil pump 4 are schematically shown in a circular shape. Suction ports 31 and 41 of the mechanical oil pump 3 and the electric oil pump 4 are also schematic ones only indicating their positions.

The mechanical oil pump 3 and the electric oil pump 4 are connected to the strainer 8 by oil passages 21 and 22 (see FIG. 1) provided inside the control valve body 7, respectively. The mechanical oil pump 3 and the electric oil pump 4 suction the oil OL stored in the oil pan 6 via the strainer 8.

The oil OL suctioned by the mechanical oil pump 3 and the electric oil pump 4 is supplied from respective discharge ports 32 and 42 to the pressure regulating circuit 70 via oil passages 23 and 24.

As shown in FIG. 1, the oil passages 22, 23, and 24 are provided with check valves 91, 92, and 93 that open and close the respective oil passages.

The check valve 92 closes the oil passage 23 when the mechanical oil pump 3 is stopped to prevent backflow of the oil OL discharged by the electric oil pump 4. The check valves 91 and 93 close the oil passages 22 and 24 when the electric oil pump 4 is stopped to prevent backflow of the oil OL discharged by the mechanical oil pump 3. The detailed configuration and operation of the check valve will be described later.

As shown in FIG. 2, the mechanical oil pump 3 is disposed near a rear end of the strainer 8 in the front-rear direction of the vehicle. The electric oil pump 4 is disposed near a front end of the strainer 8 in the front-rear direction of the vehicle. The mechanical oil pump 3 and the electric oil pump 4 are provided along line segments X1 and X2 parallel to each other. The mechanical oil pump 3 and the electric oil pump 4 are disposed above the strainer 8 that is disposed obliquely. Therefore, a straight line La orthogonal to the line segments X1 and X2 is inclined by an angle θ with respect to a horizontal line HL.

Due to the inclination, a lower portion of the mechanical oil pump 3 disposed near the rear end of the strainer 8 is located in a liquid inside the oil reservoir PL. On the other hand, a lower portion of the electric oil pump 4 disposed near the front end of the strainer 8 may be located in the air above a liquid surface of the oil reservoir PL.

As shown in FIG. 1, the mechanical oil pump 3 and the electric oil pump 4 are provided with the suction ports 31 and 41 for the oil OL, respectively. The strainer 8 is provided with connection ports 82 and 83. The suction ports 31 and 41 are connected to the connection ports 82 and 83 via the oil passages 21 and 22, respectively.

As shown in FIG. 2, due to the inclination of the strainer 8, the suction port 31 provided in the lower portion of the mechanical oil pump 3 is located in the liquid of the oil reservoir PL. A suction port 41 provided in the lower portion of the electric oil pump 4 may be located in the air. Since FIG. 1 is a schematic diagram, the suction port 31 of the mechanical oil pump 3 is also shown above the oil reservoir PL for convenience.

The pressure regulating circuit 70 is formed inside the control valve body 7 (see FIG. 2). As shown in FIG. 1, the pressure regulating circuit 70 has a line pressure oil passage 71 (supply passage) connected to the oil passages 23 and 24. A hydraulic pressure generated by the mechanical oil pump 3 and the electric oil pump 4 is input to the line pressure oil passage 71 that is a source pressure of a line pressure. The pressure regulating circuit 70 includes solenoids 76a and 76b for adjusting the line pressure, and pressure regulating valves 72 to 75. The solenoids 76a and 76b are driven based on a command (energization) from the control unit CU. The pressure regulating valves 72 to 75 are operated by signal pressures generated by the solenoids 76a and 76b.

A first pressure regulating valve 72 adjusts the line pressure input to the line pressure oil passage 71 by adjusting a drain amount of the oil OL. The first pressure regulating valve 72 also supplies a part of the oil OL to the transmission case 5 (see FIG. 2) as lubricating oil for lubricating components of the belt continuously variable transmission 1.

The line pressure adjusted by the first pressure regulating valve 72 is supplied to a second pressure regulating valve 73, a primary pressure regulating valve 74, and a secondary pressure regulating valve 75.

The second pressure regulating valve 73 adjusts a pilot pressure from the line pressure.

The pilot pressure adjusted by the second pressure regulating valve 73 is supplied to the solenoid 76a on the primary pulley P1 side and the solenoid 76b on the secondary pulley P2 side.

The solenoids 76a and 76b are connected to the primary pressure regulating valve 74 and the secondary pressure regulating valve 75, respectively. The solenoids 76a and 76b are controlled by the control unit CU. The solenoids 76a and 76b adjust the supplied pilot pressure to a signal pressure, and then supply the signal pressure to the primary pressure regulating valve 74 and the secondary pressure regulating valve 75.

The primary pressure regulating valve 74 and the secondary pressure regulating valve 75 adjust the line pressure supplied from the first pressure regulating valve 72 to an operating pressure according to the signal pressure. The oil OL adjusted to the operating pressure is supplied to the oil chambers R1 and R2 as hydraulic oil.

The pressure regulating circuit 70 is provided with an oil passage 77 (a third oil passage) communicating with the line pressure oil passage 71. The oil passage 77 is branched from a portion between a connection portion of the line pressure oil passage 71 with the oil passages 23 and 24 and the first pressure regulating valve 72. The oil OL flows into the oil passage 77 from the line pressure oil passage 71. That is, the line pressure that is the source pressure before being adjusted by the first pressure regulating valve 72 is input to the oil passage 77 from the line pressure oil passage 71. The oil passage 77 applies the input line pressure to the check valve 93. Details of the oil passage 77 will be described later together with a configuration of the check valve 93.

Figure 3:
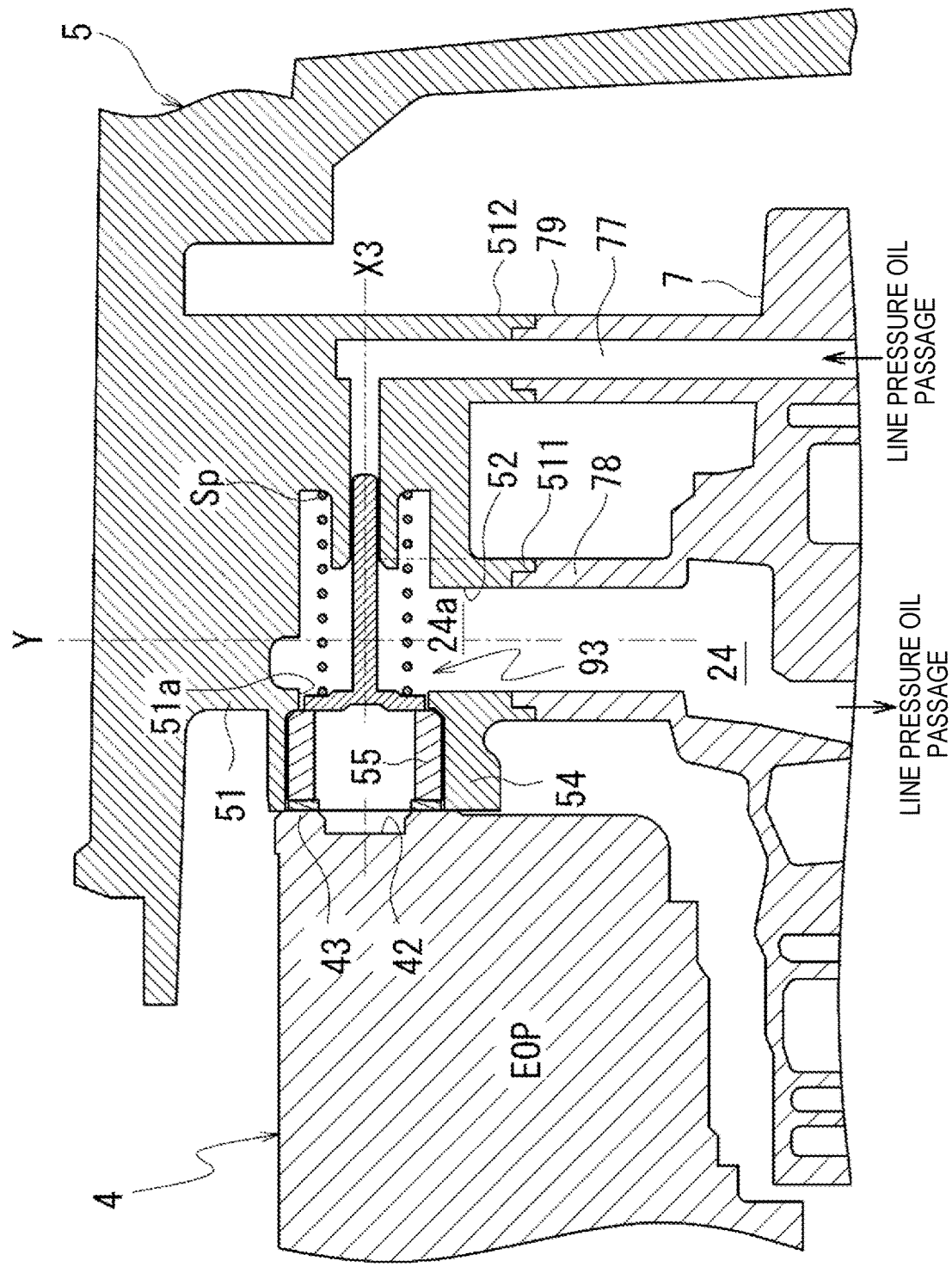
FIG. 3 is a diagram showing a specific configuration of a check valve provided in an oil passage.

FIG. 3 is a diagram showing a specific configuration of the check valve 93 provided in the oil passage 24.

Figure 4:
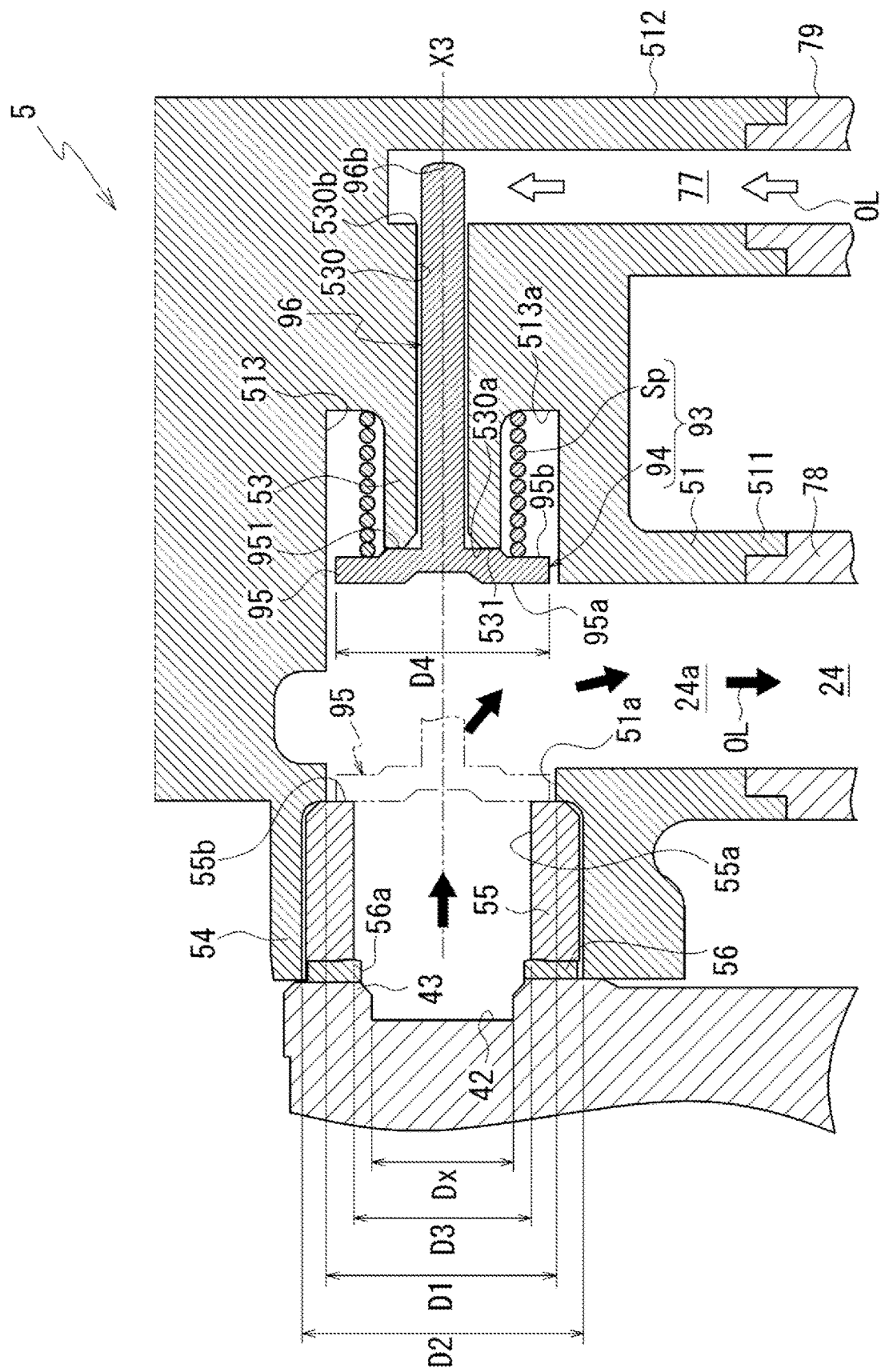
FIG. 4 is an enlarged view around the check valve of FIG. 3.

FIG. 4 is an enlarged view around the check valve 93 of FIG. 3.

In the following description, an "oil feeding direction" means a direction in which the oil OL is fed from the oil reservoir PL to the pressure regulating circuit 70 by the suction of the electric oil pump 4. FIG. 3 shows an upstream end portion 24a (hereinafter, simply referred to as an "end portion 24a") in the oil feeding direction of the oil passage 24. The end portion 24a is connected to the discharge port 42 of the electric oil pump 4.

As shown in FIG. 3, the oil passage 24 is mainly formed inside the control valve body 7, but the end portion 24a is formed inside a wall portion 51 of the transmission case 5. The wall portion 51 extends from the transmission case 5 toward the control valve body 7.

The control valve body 7 is provided with a cylindrical wall portion 78 surrounding an outer periphery of the oil passage 24. A distal end portion 511 of the wall portion 51 is fitted to an outer periphery of a distal end of the cylindrical wall portion 78. Accordingly, an inner periphery of the cylindrical wall portion 78 communicates with an inside of the wall portion 51. The oil passage 24 is connected to the inside of the control valve body 7 from the end portion 24a formed inside the wall portion 51.

The wall portion 51 has a circular opening portion 51a. The opening portion 51a is formed to penetrate the wall portion 51 in a thickness direction. The opening portion 51a allows the discharge port 42 of the electric oil pump 4 to communicate with the end portion 24a of the oil passage 24. An opening direction of the opening portion 51a is a direction orthogonal to an axis Y direction. The axis Y direction is a direction in which the oil passage 24 extends in the control valve body 7. The "opening direction" is an axis X3 direction that passes through a center of the opening portion 51a and is orthogonal to an opening surface of the opening portion 51a in the figure.

As shown in FIG. 4, a cylindrical peripheral wall portion 54 surrounding the opening portion 51a is provided on an outer periphery of the opening portion 51a. The peripheral wall portion 54 has an inner diameter D2 larger than an opening diameter D1 of the opening portion 51a. A cylindrical spacer 55 and a sealing ring 56 are provided inside the peripheral wall portion 54. An opening 55a of the spacer 55 and an opening 56a of the sealing ring 56 are arranged along the opening direction of the opening portion 51a.

The sealing ring 56 is located closer to the electric oil pump 4 of the spacer 55. The sealing ring 56 is sandwiched between the spacer 55 and a wall portion 43 surrounding the discharge port 42 of the electric oil pump 4.

An opening diameter D3 of the opening 55a of the spacer 55 is smaller than an opening diameter D1 of the opening portion 51a and larger than an opening diameter Dx of the discharge port 42 of the electric oil pump 4. An opening diameter of the opening 56a of the sealing ring 56 is larger than the opening diameter Dx of the discharge port 42.

The discharge port 42 of the electric oil pump 4, the opening 56a of the sealing ring 56, and the opening 55a of the spacer 55 are concentrically arranged on an extension of the opening portion 51a (on the axis X3). With the arrangement, the movement of the oil OL discharged from the electric oil pump 4 into the oil passage 24 is not blocked by the spacer 55 and the sealing ring 56.

The oil passage 24 is provided with a check valve 93 on an opposite side of the spacer 55 across the opening portion 51a.

The check valve 93 may be a flapper valve. The check valve 93 includes a valve body 94 and a spring Sp. The valve body 94 is movable forward and backward in the axis X3 direction. The spring Sp biases the valve body 94 toward the opening portion 51a in the axis X3 direction.

The valve body 94 may be made of, for example, aluminum. The valve body 94 includes a disk-shaped valve portion 95 and a columnar shaft portion 96. The valve portion 95 and the shaft portion 96 can be integrally formed. The valve portion 95 is disposed such that one end surface 95a in the axis X3 direction faces the opening portion 51a. The shaft portion 96 is provided closer to the other end surface 95b of the valve portion 95 in the axis X3 direction.

The wall portion 51 is provided with a housing portion 513 of the check valve 93 at a position facing the opening portion 51a. The housing portion 513 is connected to the oil passage 24 in the opening direction (the axis X3 direction) of the opening portion 51a. The housing portion 513 houses the check valve 93.

The housing portion 513 is a space having an inner diameter slightly larger than an outer diameter D4 of the valve portion 95 of the valve body 94. A support portion 53 of the valve body 94 is provided at the center of a bottom portion 513a of the housing portion 513. The support portion 53 protrudes from the bottom portion 513a toward the oil passage 24 (the electric oil pump 4).

The support portion 53 includes a hole portion 530. The shaft portion 96 of the check valve 93 is inserted into the hole portion 530. The hole portion 530 is provided to be opened toward the oil passage 24. The hole portion 530 linearly extends along the axis X3 in a direction away from the oil passage 24 in the support portion 53.

The hole portion 530 extends into the wall portion 51 beyond the support portion 53. An opening end 530a is formed at one end of the hole portion 530 in the axis X3 direction. An opening end 530b is formed at the other end of the hole portion 530 in the axis X3 direction. The opening end 530a is opened in the housing portion 513.

The hole portion 530 functions as a communication hole that allows the oil passage 77 (see FIG. 1) extending from the above pressure regulating circuit 70 to communicate with the oil passage 24.

As shown in FIG. 3, the control valve body 7 is provided with a cylindrical wall portion 79 extending in parallel to the cylindrical wall portion 78 with a space therebetween. The cylindrical wall portion 79 surrounds the oil passage 77 branched from the line pressure oil passage 71. A cylindrical distal end portion 512 extending from the wall portion 51 is fitted to an outer periphery of a distal end of the cylindrical wall portion 79. The oil passage 77 extends from the inside of the control valve body 7 to the inside of the wall portion 51 via the cylindrical wall portion 79 and the distal end portion 512.

As shown in FIG. 4, the opening end 530b of the hole portion 530 is opened to the oil passage 77. As described above, the oil OL (white arrows in the figure) branched from the line pressure oil passage 71 (see FIG. 1) and having the line pressure that is the source pressure flows into the oil passage 77.

The shaft portion 96 of the check valve 93 is inserted into the hole portion 530 from the opening end 530a. The shaft portion 96 is slidable in the hole portion 530 in the axis X3 direction.

A portion of the support portion 53 surrounding the opening end 530a of the hole portion 530 is a valve seat portion 531. The valve seat portion 531 is a flat surface orthogonal to the axis X3. When the shaft portion 96 moves toward the oil passage 77 in the axis X3 direction, a step portion 951 formed at the center of the valve portion 95 abuts against the valve seat portion 531. A length of the hole portion 530 in the axis X3 direction is set to be shorter than a length of the shaft portion 96 in the axis X3 direction. When the step portion 951 abuts against the valve seat portion 531, a distal end 96b of the shaft portion 96 is exposed from the hole portion 530 into the oil passage 77.

The spring Sp is externally inserted and attached to an outer periphery of the support portion 53. One end of the spring Sp abuts against the bottom portion 513a of the housing portion 513. The other end of the spring Sp abuts against the other end surface 95b of the valve portion 95.

As indicated by a two-dot chain line in FIG. 4, the spring Sp is attached so as to be compressed in the axis X3 direction in a state in which the valve portion 95 of the check valve 93 abuts against an end surface 55b of the spacer 55. That is, the spring Sp biases the valve portion 95 in a direction in which the opening portion 51a is closed. The oil OL flows into the hole portion 530 from the oil passage 77 via the opening end 530b. The oil OL flowing into the hole portion passes through a space between the hole portion 530 and the shaft portion 96 and reaches the valve portion 95. As described above, the oil OL flowing into the oil passage 77 has the line pressure. That is, in addition to a biasing force of the spring Sp, the line pressure acts on the valve portion 95 as an auxiliary pressure in a direction (a left direction in the figure) in which the opening portion 51a is closed. Therefore, when the electric oil pump 4 is stopped, the valve portion 95 is pressed against the end surface 55b of the spacer 55 by the spring Sp and the biasing force of the line pressure and is held at a position where the opening portion 51a is closed.

When the electric oil pump 4 is operated, as shown in FIG. 4, a hydraulic pressure (black arrows in the figure) of the oil OL discharged from the electric oil pump 4 acts on the valve portion 95 in a direction in which the opening portion 51a is opened. When the hydraulic pressure is larger than the biasing force acting on the valve portion 95, that is, the biasing force of the spring Sp and the biasing force due to the hydraulic pressure supplied to the oil passage 77, the valve portion 95 strokes in a direction away from the spacer 55 while compressing the spring Sp in the axis X3 direction.

Accordingly, the valve portion 95 is pushed into the oil passage 24 until the step portion 951 closer to the other end surface 95b abuts against the valve seat portion 531, and thus the opening portion 51a closed by the valve portion 95 is opened.

When the opening portion 51a is opened, the discharge port 42 of the electric oil pump 4 communicates with the oil passage 24 in the wall portion 51. The oil OL discharged from the electric oil pump 4 is supplied into the oil passage 24 of the control valve body 7 through the end portion 24a.

As described above, the check valve 93 provided in the oil passage 24 switches between communication and block between the oil passage 24 and the discharge port 42 of the electric oil pump 4 in accordance with operation and stop of the electric oil pump 4.

Figure 5:
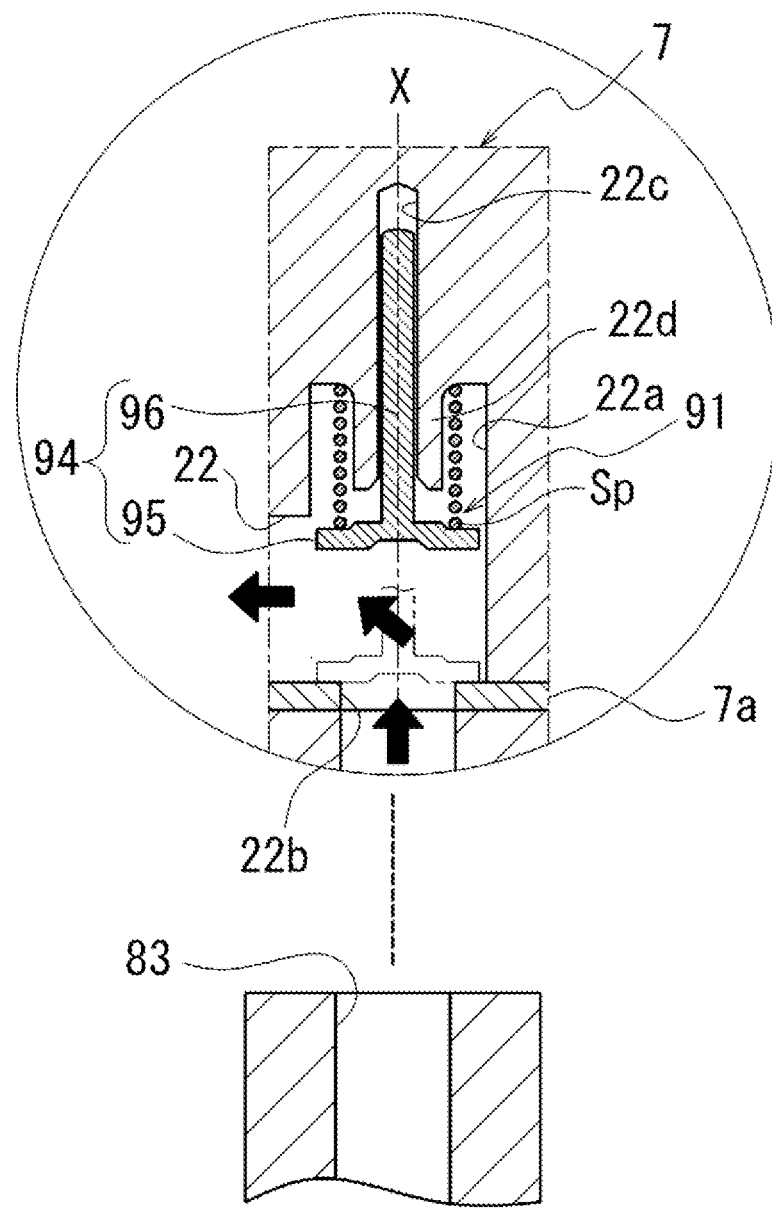
FIG. 5 is a diagram showing a specific configuration of a check valve provided in an oil passage.

FIG. 5 is a diagram showing a specific configuration of the check valve 91 provided in the oil passage 22. As described above, the oil passage 22 is an oil passage that connects the suction port 41 of the electric oil pump 4 and the strainer 8 (see FIG. 1).

As shown in FIG. 5, the oil passage 22 is formed inside the control valve body 7. The check valve 91 is provided in an upstream end portion 22a (hereinafter, simply referred to as an "end portion 22a") of the oil passage 22 in the oil feeding direction, which communicates with a connection port 83 of the strainer 8.

The end portion 22a is provided with an opening portion 22b. The opening portion 22b is formed in a separator plate disposed inside the control valve body 7. Although not shown, the connection port 83 of the strainer 8 is fitted into the control valve body 7 and communicates with the oil passage 22 via an oil passage (not shown).

The opening portion 22b is located above the connection port 83 in the vertical line VL direction (see FIG. 2). By the suction of the electric oil pump 4, the oil OL flows from the bottom to the top in the vertical line VL direction (see FIG. 1), passes through the connection port 83 and the opening portion 22b, and is introduced into the oil passage 22.

The check valve 91 may be a flapper valve having the same configuration as the check valve 93. The check valve 91 includes a valve body 94 including a valve portion 95 and a shaft portion 96. The shaft portion 96 is slidably supported by a hole portion 22c. The hole portion 22c is formed inside the control valve body 7 in which the oil passage 22 is formed. The hole portion 22c is provided along the axis X direction which is the opening direction of the opening portion 22b. A support portion 22d is formed on an outer periphery of the hole portion 22c. A spring Sp is externally inserted into the support portion 22d. The spring Sp biases the valve portion 95. The check valve 91 does not communicate with the oil passage 77 (see FIG. 1) branched from the line pressure oil passage 71, like the check valve 93. Therefore, only the biasing force of the spring Sp acts on the valve portion 95 of the check valve 91.

As shown in FIG. 5, while the electric oil pump 4 is stopped, the valve portion 95 is pressed against the opening portion 22b by the biasing force of the spring Sp. The valve portion 95 closes the opening portion 22b. When the electric oil pump 4 is operated, a negative pressure is generated by the electric oil pump 4 suctioning the oil OL. The negative pressure acts on the valve body 94. When the negative pressure is larger than the biasing force of the spring Sp, the valve portion 95 of the check valve 91 is displaced in a direction away from the opening portion 22b. The opening portion 22b is opened by the displacement of the valve portion 95.

In this way, the check valve 91 opens and closes the opening portion 22b in accordance with operation and stop of the electric oil pump 4. Accordingly, communication and block between the oil passage 22 and the connection port 83 of the strainer 8 are switched.

The check valve 92 provided in the oil passage 23 shown in FIG. 1 may also be a flapper valve having the same configuration as the check valves 91 and 93. The oil passage 23 is connected to the discharge port 32 of the mechanical oil pump 3. Although the detailed description is omitted, the check valve 92 switches between communication and block between the oil passage 23 and the discharge port 32 of the mechanical oil pump 3 in accordance with operation and stop of the mechanical oil pump 3.

As shown in FIG. 1, a high hydraulic pressure that is the source pressure of the line pressure is applied to the check valves 92 and 93 provided closer to the discharge ports 32 and 42 of the mechanical oil pump 3 and the electric oil pump 4. Therefore, the check valves 92 and 93 are required to have pressure resistance. The check valves 92 and 93 may use valve bodies 94 made of, for example, aluminum in order to increase the pressure resistance.

On the other hand, a negative pressure lower than the original pressure is applied to the check valve 91 provided closer to the suction port 41 of the electric oil pump 4 when the electric oil pump 4 is operated. Therefore, the pressure resistance required for the check valve 91 is lower than that of the check valves 92 and 93. The valve body 94 of the check valve 91 may be made of resin, for example.

Hereinafter, the operation of the check valves 91 and 93 when the electric oil pump 4 is operated and stopped in the hydraulic supply device 2 will be described.

Figure 6:
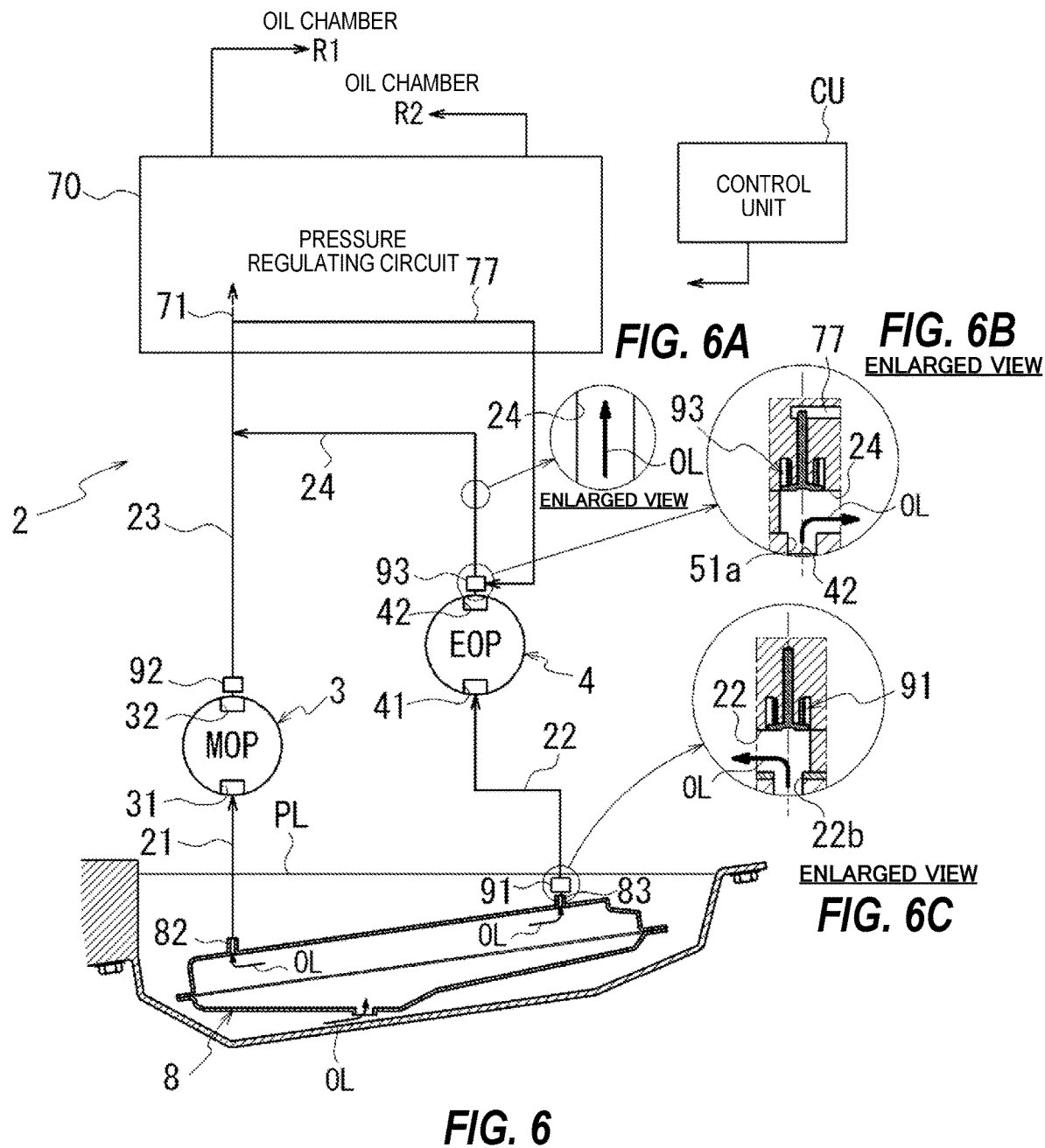
FIG. 6 is a diagram

FIGS. 6-6C are diagrams showing the operation of the check valves 91 and 93 when the electric oil pump 4 is operated.

FIGS. 6-6C show a case where the electric oil pump 4 is operated together with the mechanical oil pump 3. FIGS. 6-6C shows configurations of the check valves 91 and 93, a configuration of the pressure regulating circuit 70, and the like in a simplified manner.

The electric oil pump 4 is operated together with the mechanical oil pump 3 when a large hydraulic pressure is required, for example, for downshift of the belt continuously variable transmission 1.

The electric oil pump 4 is operated by the control unit CU. When the electric oil pump 4 starts suctioning the oil OL, as shown in FIGS. 6-6C, the check valve 91 of the oil passage 22 receives a negative pressure and is displaced in a direction in which the opening portion 22b is opened. When the opening portion 22b is opened, the oil passage 22 communicates with the connection port 83 of the strainer 8. The oil OL in the oil reservoir PL is suctioned into the strainer 8 and filtered. The oil OL flows through the oil passage 22 via the connection port 83 and is suctioned into the electric oil pump 4.

The electric oil pump 4 discharges the suctioned oil OL from the discharge port 42. The check valve 93 of the oil passage 24 receives a hydraulic pressure (a discharge pressure) and is displaced in the direction in which the opening portion 51a is opened. When the opening portion 51a is opened, the oil passage 24 communicates with the discharge port 42 of the electric oil pump 4. The oil OL flows through the oil passage 24. The hydraulic pressure generated by the suction of the electric oil pump 4 is supplied as the source pressure of the line pressure to the pressure regulating circuit 70 via the oil passage 24.

The source pressure supplied by the electric oil pump 4 is adjusted together with the source pressure supplied by the mechanical oil pump 3 in the pressure regulating circuit 70. The adjusted hydraulic pressures are supplied to the oil chambers R1 and R2. When the required amount of hydraulic pressure is supplied to the oil chambers R1 and R2, the control device CU stops the electric oil pump 4.

Figure 7:
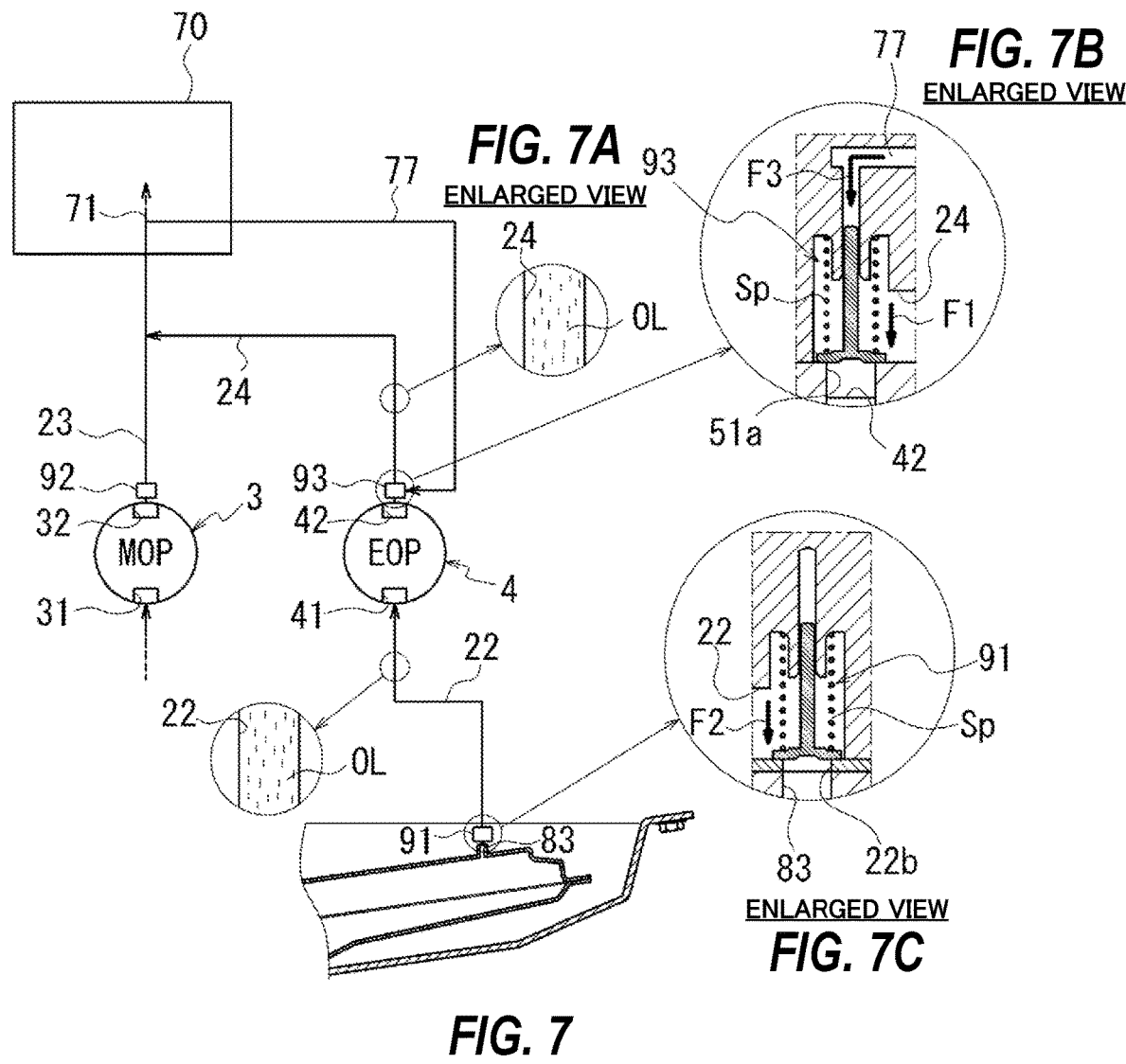
FIG. 7 is a diagram

FIGS. 7-7C are diagrams showing the operation of the check valves 91 and 93 when the electric oil pump 4 is stopped. In FIG. 7 FIGS. 7-7C, the illustration of a configuration unnecessary for description is appropriately omitted.

As shown in FIGS. 7-7C, when the electric oil pump 4 is stopped, no hydraulic pressure (the discharge pressure) is applied to the check valve 93 of the oil passage 24. On the other hand, a biasing force F1 of the spring Sp and a biasing force F3 due to the line pressure of the oil OL flowing into the oil passage 77 act on the check valve 93. Accordingly, the check valve 93 is displaced in the direction in which the opening portion 51a is opened. When the opening portion 51a is closed, the communication between the oil passage 24 and the discharge port 42 of the electric oil pump 4 is blocked.

Similarly, no negative pressure of the electric oil pump 4 is applied to the check valve 91 of the oil passage 22. The check valve 91 is displaced by a biasing force F2 of the spring Sp in a direction in which the opening portion 22b is closed. When the opening portion 22b is closed, the communication between the oil passage 22 and the connection port 83 of the strainer 8 is blocked.

In this way, when the electric oil pump 4 is stopped, an upstream side (a discharge side) and a downstream side (a suction side) of the electric oil pump 4 are blocked by the check valves 91 and 93, respectively. Even when the electric oil pump 4 is stopped, the mechanical oil pump 3 discharges the oil OL. By providing the check valve 91 and the check valve 93, it is possible to prevent the oil OL from flowing back to the electric oil pump 4 from the mechanical oil pump 3 and the pressure regulating circuit 70 when the electric oil pump 4 is stopped. This prevents a reduction in the amount of oil OL supplied from the mechanical oil pump 3 to the pressure regulating circuit 70.

When the electric oil pump 4 is stopped and the discharge pressure is not applied, the check valve 91 and the check valve 93 start to be displaced in a direction in which the oil passages 22 and 24 are closed. In the hydraulic supply device 2, the check valve 93 is controlled to close the oil passage 24 earlier than the check valve 91 closes the oil passage 22.

This is to prevent a high pressure being applied to the check valve 91 of the oil passage 22 due to the back-flowing oil OL.

If the closing of the oil passage 24 of the check valve 93 is slower than the closing of the oil passage 22 of the check valve 91, the back-flowing oil OL may be applied to the check valve 91.

On the other hand, as described above, the check valve 91 of the oil passage 22 is generally operated by a negative pressure caused by the suction of the electric oil pump 4. Since the check valve 91 does not require pressure resistance as compared with the check valve 93, the valve body 94 made of, for example, resin may be used.

However, when a high pressure is applied to the valve body 94 made of resin due to the backflow of the oil OL, the product life of the check valve 91 may be shortened. In order to improve the pressure resistance of the check valve 91, for example, the valve body 94 made of aluminum may be used, but production cost of the check valve 91 may increase.

In the hydraulic supply device 2, the check valve 93 closes the oil passage 24 earlier than the check valve 91 closes the oil passage 22. This is to prevent a high pressure being applied to the check valve 91. For example, a stroke speed of the check valve 93 can be set to be larger than a stroke speed of the check valve 91. As described above, while the check valve 91 is only subjected to the biasing force F2 of the spring Sp, the check valve 93 is subjected to the biasing force F3 of the line pressure in addition to the biasing force F1 of the spring Sp. That is, the stroke speed of the check valve 93 is easily set to be larger than the stroke speed of the check valve 91 by applying the biasing force F2 of the line pressure.

Here, the check valve 93 is not limited to only applying the biasing force F3 of the line pressure. The stroke speed of the check valve 93 may be set to be larger than the stroke speed of the check valve 91 by adjusting only a load of the spring Sp provided in each of the check valves 91 and 93.

Figure 8:
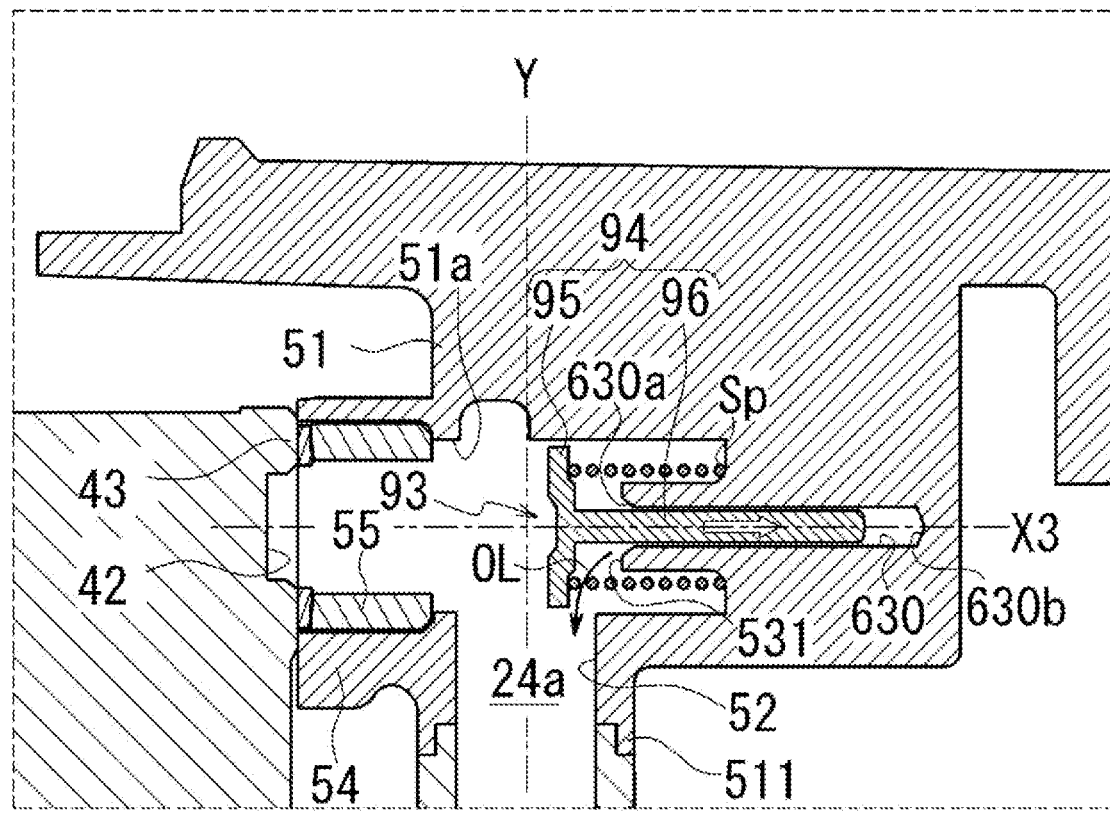
FIG. 8 is a diagram showing a comparative example.

FIG. 8 is a diagram showing a comparative example.

As shown in FIG. 8, in the comparative example, the oil passage 77 for inputting the line pressure to the check valve 93 is not provided. A hole portion 630 that supports the shaft portion 96 of the check valve 93 has an opening end 630a formed on one end side in the axis X3 direction and a bottom portion 630b formed on the other end side, which is closed, in the axis X3 direction.

When the electric oil pump 4 is operated, the hydraulic pressure (the discharge pressure) discharged by the electric oil pump 4 is applied to the valve portion 95 of the valve body 94 as in the embodiment. When the hydraulic pressure exceeds the biasing force of the spring Sp, the shaft portion 96 slides toward the bottom portion 630b of the hole portion 630 to open the opening portion 51a as indicated by a white arrow. At this time, the oil OL entering the hole portion 630 is pushed out to the outside from the opening end 630a of the hole portion 630 by the sliding of the shaft portion 96. The shaft portion 96 further slides, and the valve portion 95 abuts against the valve seat portion 531. The opening end 630a is closed by the valve portion 95. An inside of the hole portion 630 is sealed and is in a state close to vacuum.

In the hole portion 630 in a state close to vacuum, a negative pressure is generated to draw the shaft portion 96 toward the bottom portion 630b. When the electric oil pump 4 is stopped, the hydraulic pressure applied to the valve portion 95 is released. By the biasing force of the spring Sp, the valve body 94 moves toward the opening portion 51a to close the opening portion 51a.

However, when the hole portion 630 is in a vacuum state, the negative pressure acts in a direction opposite to the biasing force of the spring Sp. Due to the action of the negative pressure, the movement of the valve body 94 may be slowed down. That is, even when the load of the spring Sp is adjusted, the stroke speed of the check valve 93 may be reduced due to the generation of negative pressure. When the stroke speed of the check valve 93 is reduced, the closing of the check valve 93 cannot be completed earlier than that of the check valve 91.

Therefore, in the embodiment, as shown in FIG. 4, the oil passage 77 branched from the line pressure oil passage 71 is provided. The oil passage 77 communicates with the hole portion 530 via the opening end 530b. The oil OL flows into the hole portion 530 from the oil passage 77. Accordingly, even when the oil OL is pushed out from the opening end 530a by the sliding of the shaft portion 96, the hole portion 530 is less likely to be vacuumed.

Further, even when the electric oil pump 4 is stopped, the line pressure of the oil OL discharged by the mechanical oil pump 3 is input to the hole portion 530. That is, as shown in FIGS. 7-7C, in addition to the biasing force F1 of the spring Sp, the biasing force F3 of the line pressure (the auxiliary pressure) as a high pressure acts on the check valve 93 in the direction in which the opening portion 51a of the oil passage 24 is closed. Accordingly, the stroke speed of the check valve 93 is easily set to be larger than that of the check valve 91.

As a result, the operability when the check valve 93 closes the oil passage 24 can be enhanced. The check valve 93 can close the oil passage 24 earlier than the check valve 91 closes the oil passage 22. Accordingly, a part of the oil OL in the oil passage 24 can be prevented from flowing back into the oil passage 22 and applying a high pressure to the check valve 91. Therefore, even when the valve body 94 made of, for example, resin is used for the check valve 91, it is possible to reduce the possibility of a decrease in product life.

Examples of the hydraulic supply device 2 according to an aspect of the present invention will be listed below.

(1) A hydraulic supply device 2 has a line pressure oil passage 71 (a supply passage) for supplying hydraulic oil of a belt continuously variable transmission 1 (a hydraulically operated machine).

The hydraulic supply device 2 includes a mechanical oil pump 3 (a first oil pump) and an electric oil pump 4 (a second oil pump). The mechanical oil pump 3 supplies oil OL suctioned from an oil reservoir PL (an oil source) to the line pressure oil passage 71.

The electric oil pump 4 is driven together with the mechanical oil pump 3. Alternatively, the electric oil pump 4 is driven when the mechanical oil pump 3 is stopped. The electric oil pump 4 supplies the oil OL suctioned from the oil reservoir PL to the line pressure oil passage 71.

The hydraulic supply device 2 includes a check valve 91 (a first check valve) and a check valve 93 (a second check valve). The check valve 91 is provided in an oil passage 22 (a first oil passage) that allows a suction port 41 (a suction side) of the electric oil pump 4 to communicate with the oil reservoir PL. The check valve 91 closes the oil passage 22 when the electric oil pump 4 is stopped.

The check valve 93 is provided in an oil passage 24 (a second oil passage) that allows the discharge port 42 (a discharge side) of the electric oil pump 4 to communicate with the line pressure oil passage 71. The check valve 93 closes the oil passage 24 when the electric oil pump 4 is stopped.

The hydraulic supply device 2 includes an oil passage 77 (a third oil passage). The oil passage 77 communicates with the line pressure oil passage 71. The oil OL supplied to the line pressure oil passage 71 flows into the oil passage 77.

The hydraulic supply device 2 uses the oil OL supplied from the mechanical oil pump 3 and flowing into the oil passage 77 as an auxiliary pressure for operation of the check valve 93 when the oil passage 24 is closed.

When the electric oil pump 4 is stopped, the hydraulic supply device 2 closes the oil passage 22 closer to the suction port 41 of the electric oil pump 4 with the check valve 91. The hydraulic supply device 2 closes the oil passage 24 closer to the discharge port 42 with the check valve 93. This prevents backflow of the oil OL from the line pressure oil passage 71. The check valve 91 provided closer to the suction port 41 of the electric oil pump 4 is not required to have as much pressure resistance as the check valve 93 closer to the discharge port 42, and thus an inexpensive material such as resin may be used.

However, if the operation of the check valve 93 is delayed, the oil OL may flow back to the oil passage 24. When the oil OL flows back to the oil passage 24, a high hydraulic pressure acts on the check valve 91 that closes the oil passage 24. In this case, it is difficult to use an inexpensive material such as resin for the check valve 91.

The hydraulic supply device 2 includes the oil passage 77 communicating with the line pressure oil passage 71. When the electric oil pump 4 is stopped, the oil OL supplied by the mechanical oil pump 3 flows into the oil passage 77 from the line pressure oil passage 71. The hydraulic supply device 2 uses the oil OL flowing into the oil passage 77 as an auxiliary pressure for the operation of the check valve 93. Accordingly, the operability of the check valve 93 is enhanced. The hydraulic supply device 2 can quickly operate the check valve 93 to close the oil passage 24 when the electric oil pump 4 is stopped. The hydraulic supply device 2 can reduce backflow of the oil OL to the oil passage 24. As a result, the hydraulic supply device 2 can include the check valve 91 using an inexpensive material such as resin. The hydraulic supply device 2 can reduce production cost.

(2) In the hydraulic supply device 2, the oil passage 77 (the third oil passage) is branched from, for example, the line pressure oil passage 71 (the supply passage). A line pressure that is a source pressure of the hydraulic oil supplied to the belt continuously variable transmission 1 (the hydraulically operated machine) is input to the line pressure oil passage 71 from the mechanical oil pump 3 (the first oil pump) and the electric oil pump 4 (the second oil pump).

In the hydraulic supply device 2, the oil passage 77 is branched from the line pressure oil passage 71. The line pressure that is a source pressure is introduced into the oil passage 77. Since a high pressure acts on the check valve 93, the hydraulic supply device 2 can close the check valve 93 earlier than the check valve 91.

(3) In the hydraulic supply device 2, the check valve 93 (the second check valve) includes, for example, a valve body 94.

The valve body 94 is movable forward and backward in an axis X3 direction which is an opening direction of the discharge port 42 of the electric oil pump 4 (the second oil pump).

The valve body 94 includes, for example, a shaft portion 96 and a valve portion 95.

The shaft portion 96 extends in the axis X3 direction (the opening direction).

The valve portion 95 is provided at one end of the shaft portion 96 on the discharge port 42 side. The valve portion 95 has an outer diameter D4 that allows the discharge port 42 to be closed.

The shaft portion 96 is preferably supported slidably in the axis X3 direction by a hole portion 530 (a communication hole) that allows the oil passage 24 (the second oil passage) and the oil passage 77 (the third oil passage) to communicate with each other.

The oil OL flowing into the oil passage 77 flows into the hole portion 530 to apply an auxiliary pressure to the valve portion 95.

By using a flapper valve as the check valve 93, it is possible to increase a flow rate of the oil OL when the oil passage 24 is opened as compared with, for example, a ball valve.

When the check valve 93 is provided in the closed hole portion 630 (see the comparative example of FIG. 8), the oil OL may escape from the hole portion 630 due to sliding of the shaft portion 96 when the oil passage 24 is opened. When the oil OL is discharged, the hole portion 630 is in a vacuum state, and a negative pressure is generated. The negative pressure may delay the closing of the oil passage 24 by the check valve 93 when the electric oil pump 4 is stopped.

The hydraulic supply device 2 is provided with a hole portion 530 communicating with the oil passage 77. The shaft portion 96 of the check valve 93 is supported by the hole portion 530. Accordingly, even if the shaft portion 96 slides in the hole portion 530, a vacuum state is unlikely to occur, and the generation of the negative pressure is reduced. Further, the oil OL flows into the hole portion 530 from the oil passage 77, and the line pressure as the auxiliary pressure is applied to the shaft portion 96 supported by the hole portion 530. Accordingly, the check valve 93 can be quickly operated to close the oil passage 24.

(4) In the hydraulic supply device 2, when the electric oil pump 4 (the second oil pump) is stopped, the check valve 93 (the second check valve) closes the oil passage 24 earlier than the check valve 91 (the first check valve) closes the oil passage 22 (the first oil passage).

The check valve 91 may be made of, for example, resin. The check valve 93 may be made of, for example, aluminum.

In the hydraulic supply device 2, by closing the oil passage 24 earlier than the oil passage 22, it is possible to prevent a high hydraulic pressure from being applied to the check valve 91. Accordingly, the check valve 91 can be made of, for example, inexpensive resin, and the production cost can be reduced.

(5) In the hydraulic supply device 2, the electric oil pump 4 (the second oil pump) suctions the oil OL from the oil reservoir PL as the oil source via a strainer 8.

The strainer 8 includes a connection port 83 with the oil passage 22 (the first oil passage).

The check valve 91 blocks communication between the oil passage 22 and the connection port 83 when the electric oil pump 4 (the second oil pump) is stopped.

When a high hydraulic pressure is applied to the check valve 91, the hydraulic pressure is also transmitted to the connection port 83 of the strainer 8. When the hydraulic pressure is applied to the connection port 83, the product life of the strainer 8 may be reduced. The hydraulic supply device 2 can prevent the hydraulic pressure from being transmitted to the connection port 83 by providing the check valve 91.

(6) The hydraulically operated machine may be, for example, the belt continuously variable transmission 1 (a transmission for a vehicle). In the hydraulic supply device 2, the mechanical oil pump 3 (the first oil pump) is driven by, for example, a driving force of an engine. The electric oil pump 4 (the second oil pump) is driven by, for example, a driving force of an electric motor.

The oil passage 22 connects the oil reservoir PL and the electric oil pump 4. When the electric oil pump 4 is stopped, air enters the oil passage 22 through gaps between components or the like. When the air enters, the oil OL may escape from the oil passage 22. When the electric oil pump 4 is operated again in a state in which the oil OL is discharged from the oil passage 22, the electric oil pump 4 idles until the air is discharged from the oil passage 22. The electric oil pump 4 may delay the discharge of the oil OL.

When the electric oil pump 4 is used at the time of stopping the mechanical oil pump 3, such as idling stop, a slight operation delay is unlikely to cause a problem. On the other hand, when a large hydraulic pressure is required, for example, for downshift of the continuously variable transmission, the electric oil pump 4 is used to assist the mechanical oil pump 3. In such a case, the electric oil pump 4 is required to have responsiveness to quickly operate.

The hydraulic supply device 2 is provided with the oil passages 22 and 24 connected to the suction port 41 and the discharge port 42 of the electric oil pump 4, respectively. The hydraulic supply device 2 is provided with the check valves 91 and 93 that close the oil passages 22 and 24 when the electric oil pump 4 is stopped. Accordingly, the oil OL is less likely to escape from the oil passage 22 when the electric oil pump 4 is stopped. The responsiveness of the electric oil pump 4 can be improved.

In the aspect of the present invention, the example in which the transmission case 5 is obliquely disposed as shown in FIG. 2 has been described. The present invention is not limited to the aspect. For example, the transmission case 5, the oil pan 6, and the strainer 8 may be disposed horizontally without being inclined as long as the degree of freedom of a layout is allowed. The suction port 41 of the electric oil pump 4 may be located in the liquid in the oil reservoir PL.

In the aspect of the present invention, the configuration in which the check valve 93 is disposed inside the transmission case 5 as shown in FIGS. 3 and 4 has been described. The present invention is not limited to the aspect. The check valve 93 may be disposed inside the control valve body 7, for example, similar to the check valve 91.

In the aspect of the present invention, an example in which the hydraulic supply device is installed in a vehicle has been described. The present invention is not limited to the aspect. The hydraulic supply device can also be applied to ones other than vehicles.

Although the embodiment of the invention has been described above, the above embodiment merely exemplifies one application example of the invention and does not intend to limit the technical scope of the invention to the specific configuration of the above embodiment.

REFERENCE SIGNS LIST 1 belt continuously variable transmission (hydraulically operated machine)
2 hydraulic supply device
22 oil passage (first oil passage)
24 oil passage (second oil passage)
3 mechanical oil pump (first oil pump)
4 electric oil pump (second oil pump)
41 suction port (suction side)
42 discharge port (discharge side)
530 hole portion (communication hole)
71 line pressure oil passage (supply passage)
77 oil passage (third oil passage)
8 strainer
83 connection port
91 check valve (first check valve)
93 check valve (second check valve)
94 valve body
95 Valve portion
96 shaft portion
OL oil
PL oil reservoir (oil source)

The present application claims a priority of Japanese Patent Application No. 2021-014933 filed with the Japan Patent Office on Feb. 2, 2021, all the contents of which are hereby incorporated by reference.

The invention claimed is:

1. A hydraulic supply device having a supply passage for supplying hydraulic oil of a hydraulically operated machine, the hydraulic supply device comprising:
    a first oil pump configured to supply oil suctioned from an oil source to the supply passage;
    a second oil pump driven together with the first oil pump or driven when the first oil pump is stopped, and configured to supply the oil suctioned from the oil source to the supply passage;
    a first check valve provided in a first oil passage that allows a suction side of the second oil pump to communicate with the oil source, and configured to close the first oil passage when the second oil pump is stopped;
    a second check valve provided in a second oil passage that allows a discharge side of the second oil pump to communicate with the supply passage, and configured to close the second oil passage when the second oil pump is stopped; and
    a third oil passage communicating with the supply passage and into which the oil supplied to the supply passage flows, wherein
    the oil supplied from the first oil pump and flowing into the third oil passage is used as an auxiliary pressure for operation of the second check valve when the second oil passage is closed.

2. The hydraulic supply device according to claim 1, wherein
    the third oil passage is branched from the supply passage, and
    a line pressure that is a source pressure of hydraulic oil supplied to the hydraulically operated machine is input to the supply passage by the first oil pump and the second oil pump.

3. The hydraulic supply device according to claim 1, wherein
    the second check valve includes
        a valve body movable forward and backward in an opening direction of a discharge port of the second oil pump,
    the valve body includes
        a shaft portion extending in the opening direction, and
        a valve portion provided at one end of the shaft portion on a discharge port side and having an outer diameter that allows the discharge port to be closed,
    the shaft portion is slidably supported in the opening direction by a communication hole that allows the second oil passage and the third oil passage to communicate with each other, and
    the oil flowing into the third oil passage flows into the communication hole to apply the auxiliary pressure to the valve portion.

4. The hydraulic supply device according to claim 1, wherein when the second oil pump is stopped, the second check valve closes the second oil passage earlier than the first check valve closes the first oil passage, and the first check valve is made of resin, and the second check valve is made of aluminum.

5. The hydraulic supply device according to claim 1, wherein the second oil pump suctions oil from an oil reservoir that is the oil source via a strainer, the strainer includes a connection port with the first oil passage, and the first check valve blocks communication between the first oil passage and the connection port when the second oil pump is stopped.

6. The hydraulic supply device according to claim 1, wherein the hydraulically operated machine is a transmission for a vehicle, the first oil pump is driven by a driving force of an engine, and the second oil pump is driven by a driving force of an electric motor.

* * * * *